United States Patent
Shivaram

(10) Patent No.: US 11,888,467 B2
(45) Date of Patent: Jan. 30, 2024

(54) TEMPERATURE COMPENSATION OF ANALOG CMOS PHYSICALLY UNCLONABLE FUNCTION FOR YIELD ENHANCEMENT

(71) Applicant: Raytheon Company, Waltham, MA (US)

(72) Inventor: Krishna Shivaram, Torrance, CA (US)

(73) Assignee: Raytheon Company, Tewksbury, MA (US)

( * ) Notice: Subject to any disclaimer, the term of this patent is extended or adjusted under 35 U.S.C. 154(b) by 301 days.

(21) Appl. No.: 17/478,718

(22) Filed: Sep. 17, 2021

(65) Prior Publication Data

US 2023/0090064 A1   Mar. 23, 2023

(51) Int. Cl.
   *H03K 17/14*   (2006.01)
   *H03K 17/082*  (2006.01)
   *H03K 17/08*   (2006.01)

(52) U.S. Cl.
   CPC ....... *H03K 17/145* (2013.01); *H03K 17/0822* (2013.01); *H03K 2017/0806* (2013.01)

(58) Field of Classification Search
   CPC .............. H03K 17/145; H03K 17/082; H03K 17/0822; H03K 2017/0806
   See application file for complete search history.

(56) References Cited

U.S. PATENT DOCUMENTS

| | | |
|---|---|---|
| 8,861,736 B2 | 10/2014 | BrightSky et al. |
| 9,501,664 B1 | 11/2016 | Hamlet |
| 10,606,292 B1 * | 3/2020 | Lai ............... G05F 3/30 |
| 10,742,221 B2 | 8/2020 | Usuda et al. |

(Continued)

FOREIGN PATENT DOCUMENTS

| | | |
|---|---|---|
| CN | 108345352 A | 7/2018 |
| WO | 2017/015850 A1 | 2/2017 |

OTHER PUBLICATIONS

Kumar, Raghavan, et al., "On Design of Temperature Invariant Physically Unclonable Functions based on Ring Oscillators", 2012 IEEE Computer Society Annual Symposium on VLSI, 2012, 6 pages, IEEE.

(Continued)

*Primary Examiner* — Jared Fureman
*Assistant Examiner* — Christopher J Clark

(57) ABSTRACT

An apparatus includes a current-based temperature compensation circuit having a reference buffer, a biasing current mirror, and a controller. The reference buffer is configured to receive a biasing reference voltage at a voltage input terminal and replicate the biasing reference voltage to first and second buffer terminals. At least one of the first and second buffer terminals is configured to be electrically connected to at least one gate terminal of an analog complementary metal oxide semiconductor (CMOS) physically unclonable function (PUF) cell. The biasing current mirror is configured to receive a reference current at a current input terminal and replicate the reference current to the first buffer terminal. The controller is configured to compensate an output of the CMOS PUF cell for temperature variation based on a weighted sum of a bandgap current, a current proportional to absolute temperature, and a current complementary to absolute temperature.

20 Claims, 9 Drawing Sheets

(56) References Cited

U.S. PATENT DOCUMENTS

2015/0236693 A1* 8/2015 Pfeiffer ............... H03K 19/003
　　　　　　　　　　　　　　　　　　　　　　326/8
2019/0132137 A1 5/2019 Zhong et al.

OTHER PUBLICATIONS

Puntin, D., et al., "CMOS Unclonable System for Secure Authentication Based on Device Variability", 34th European Solid-state Circuits Conference, 2008, 4 pages, IEEE.
Zhao et al., "A 124 fJ/Bit Cascode Current Mirror Array Based PUF With 1.50% Native Unstable Bit Ratio", IEEE Transactions on Circuits and Systems—I: Regular Papers, vol. 66, No. 9, Sep. 2019, 10 pages.
International Search Report and Written Opinion of the International Searching Authority dated Dec. 16, 2022 in connection with International Patent Application No. PCT/US2022/074478, 11 pages.

* cited by examiner

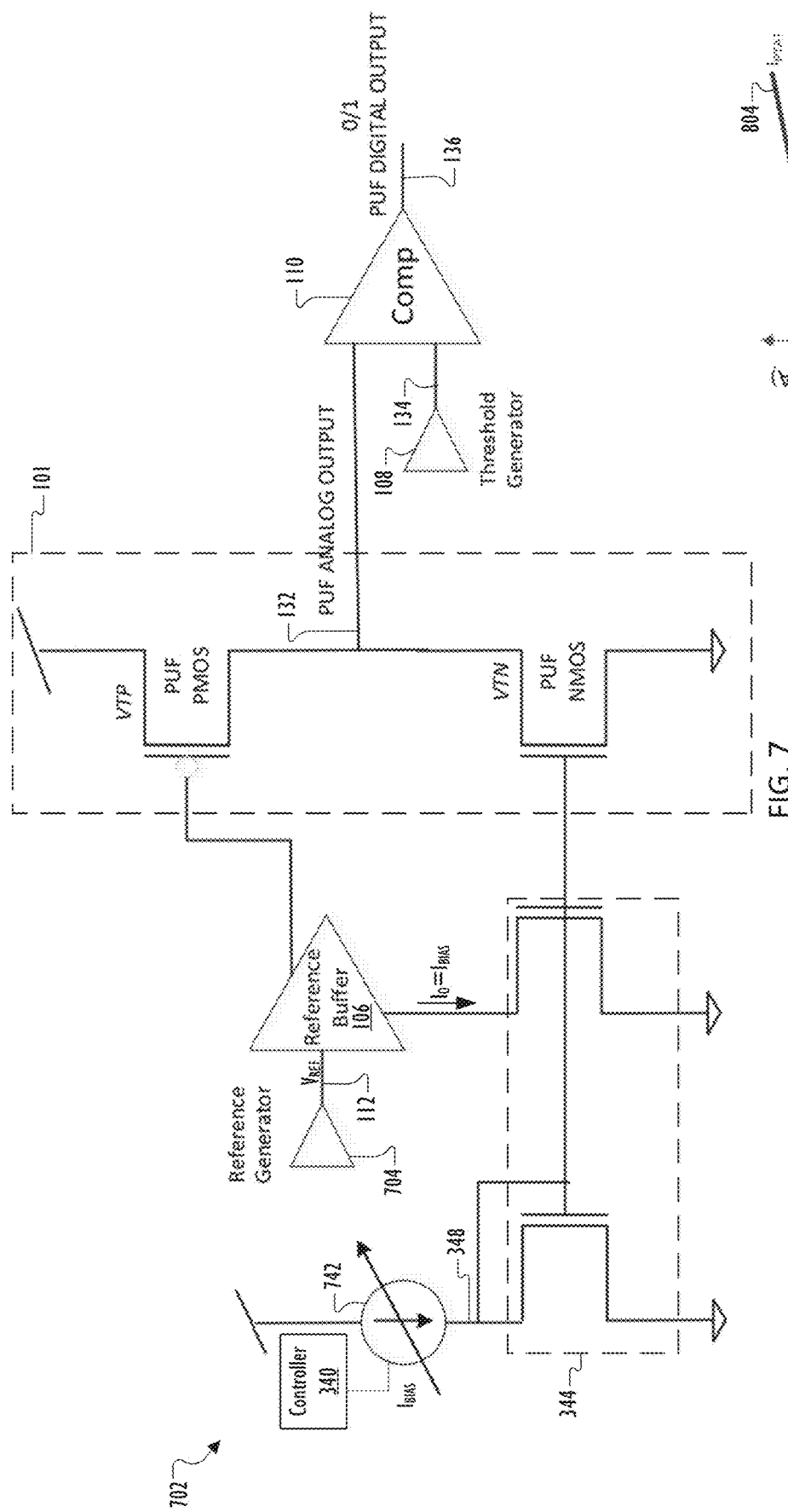
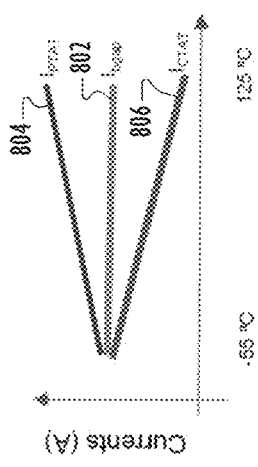
FIG. 7
FIG. 8

US 11,888,467 B2

1

TEMPERATURE COMPENSATION OF ANALOG CMOS PHYSICALLY UNCLONABLE FUNCTION FOR YIELD ENHANCEMENT

GOVERNMENT RIGHTS

This invention was made with U.S. government support under contract number FA8807-19-C-0002 awarded by the U.S. Air Force. The U.S. government has certain rights in this invention.

TECHNICAL FIELD

This disclosure relates generally to integrated circuits. More specifically, this disclosure relates to temperature compensation of an analog complementary metal oxide semiconductor (CMOS) physically unclonable function (PUF) for yield enhancement.

BACKGROUND

A physically unclonable function (PUF) (also called a non-volatile memory (NVM) unit cell) refers to a security mechanism that uses specified inputs to generate a unique digital output (often called a "fingerprint"). This type of function can be useful in various circumstances, such as to uniquely identify a digital device like a microprocessor. An analog complementary metal oxide semiconductor (CMOS)-based physically unclonable function often suffers from large temperature variations. For example, a non-volatile memory (NVM) unit cell may be designed to operate in a temperature range of 0° C. to 35° C., but field conditions may include an extended temperature range of −55° C. to 125° C. Operating over this extended temperature range may cause outputs from the CMOS-based physically unclonable function to vary with respect to temperature. This can lead to significant yield losses during production. For instance, an NVM unit may be designed to provide 1,024 bits, but temperature variations may cause the NVM unit to suffer an 80% loss (a 20% yield). This equates to only about 205 bits being useful, while the remaining bits are discarded or ignored.

SUMMARY

This disclosure provides temperature compensation of an analog complementary metal oxide semiconductor (CMOS) physically unclonable function for yield enhancement.

In a first embodiment, an apparatus includes a current-based temperature compensation circuit having a reference buffer, a biasing current mirror, and a controller. The reference buffer is configured to receive a biasing reference voltage at a voltage input terminal and replicate the biasing reference voltage to first and second buffer terminals. At least one of the first and second buffer terminals is configured to be electrically connected to at least one gate terminal of an analog complementary metal oxide semiconductor (CMOS) physically unclonable function (PUF) cell. The biasing current mirror is configured to receive a reference current at a current input terminal and replicate the reference current to the first buffer terminal. The controller is configured to compensate an output of the CMOS PUF cell for temperature variation based on a weighted sum of a bandgap current, a current proportional to absolute temperature, and a current complementary to absolute temperature.

2

In a second embodiment, a system includes an analog CMOS PUF cell having at least one gate terminal. The system also includes a current-based temperature compensation circuit having a reference buffer, a biasing current mirror, and a controller. The reference buffer is configured to receive a biasing reference voltage at a voltage input terminal and replicate the biasing reference voltage to first and second buffer terminals. At least one of the first and second buffer terminals is electrically connected to the at least one gate terminal of the CMOS PUF cell. The biasing current mirror is configured to receive a reference current at a current input terminal and replicate the reference current to the first buffer terminal. The controller is configured to compensate an output of the CMOS PUF cell for temperature variation based on a weighted sum of a bandgap current, a current proportional to absolute temperature, and a current complementary to absolute temperature.

In a third embodiment, a method includes receiving a biasing reference voltage at a voltage input terminal of a reference buffer in a current-based temperature compensation circuit and replicating the biasing reference voltage to first and second buffer terminals. At least one of the first and second buffer terminals is electrically connected to at least one gate terminal of an analog CMOS PUF cell. The method also includes receiving a reference current at a current input terminal of a biasing current mirror in the current-based temperature compensation circuit and replicating the reference current to the first buffer terminal. The method further includes, using a controller in the current-based temperature compensation circuit, compensating an output of the CMOS PUF cell for temperature variation based on a weighted sum of a bandgap current, a current proportional to absolute temperature, and a current complementary to absolute temperature.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which:

FIG. 7 illustrates a second example current-based temperature compensation circuit for providing temperature stability to a CMOS PUF cell according to this disclosure;

FIG. 8 illustrates an example graph showing CMOS PUF-related electrical currents with respect to temperature according to this disclosure;

DETAILED DESCRIPTION

Figure 1:
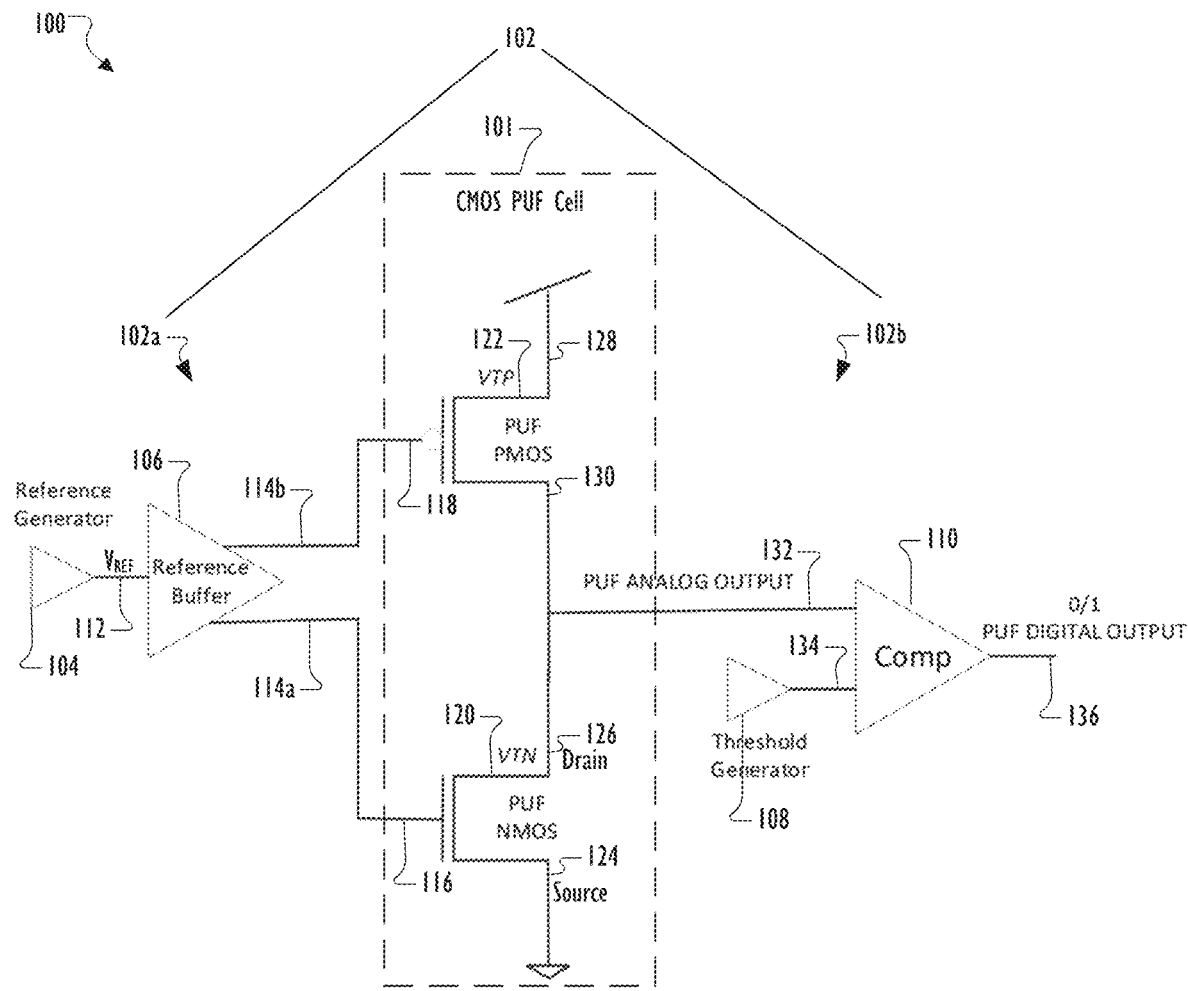
FIG. 1 illustrates an example system for providing temperature stability to a complementary metal oxide semiconductor (CMOS) physically unclonable function (PUF) cell according to this disclosure.

FIGS. 1 through 12, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, a physically unclonable function (PUF) (also called non-volatile memory (NVM) unit cell) refers to a security mechanism that uses specified inputs to generate a unique digital output (often called a "fingerprint"). This type of function can be useful in various circumstances, such as to uniquely identify a digital device like a microprocessor. An analog complementary metal oxide semiconductor (CMOS)-based physically unclonable function often suffers from large temperature variations. For example, a non-volatile memory (NVM) unit cell may be designed to operate in a temperature range of 0° C. to 35° C., but field conditions may include an extended temperature range of −55° C. to 125° C. Operating over this extended temperature range may cause outputs from the CMOS-based physically unclonable function to vary with respect to temperature. This can lead to significant yield losses during production. For instance, an NVM unit may be designed to provide 1,024 bits, but temperature variations may cause the NVM unit to suffer an 80% loss (a 20% yield). This equates to only about 205 bits being useful, while the remaining bits are discarded or ignored.

One technique for compensating for this type of yield loss is to fabricate multiple redundant PUF cells in the same device. For example, if a fabrication process provides a 20% yield, one approach might be to fabricate five redundant PUF cells in the device. However, this approach increases costs, lengthens calibration times, and increases the size, weight, and power requirements of the device. In general, it can be extremely challenging to compensate for temperature variations of CMOS PUF cells over an extended temperature range, such as from −55° C. to 125° C.

This disclosure provides mechanisms for improving the temperature stability of CMOS PUF cells, which can significantly improve the yields of the CMOS PUF cells. As described in more detail below, these approaches utilize a current-based temperature compensation circuit that includes a reference buffer, a biasing current mirror, and a controller. The reference buffer can replicate a biasing reference voltage to first and second buffer terminals, where at least one of the first and second buffer terminals is electrically connected to at least one gate terminal of an analog CMOS PUF cell. The biasing current mirror can replicate a reference current to the first buffer terminal. The controller can compensate an output of the CMOS PUF cell for temperature variation based on a weighted sum of a bandgap current, a current proportional to absolute temperature, and a current complementary to absolute temperature. In this way, the described approaches can improve the temperature stability of CMOS PUF cells while having low power dissipation and a small footprint. Moreover, this can be accomplished without requiring complex state machine-controlled loops.

FIG. 1 illustrates an example system 100 for providing temperature stability to a CMOS PUF cell 101 according to this disclosure. As shown in FIG. 1, the system 100 includes a current-based temperature compensation circuit 102 that, when connected to the CMOS PUF cell 101, compensates for temperature variations in an output from the CMOS PUF cell 101. In this example, one portion 102a of the compensation circuit 102 controls inputs to the CMOS PUF cell 101 in order to at least partially provide temperature stability to the CMOS PUF cell 101. Another portion 102b of the compensation circuit 102 controls digitization of an analog output from the CMOS PUF cell 101 in order to at least partially provide temperature stability to the CMOS PUF cell 101.

Figure 4:
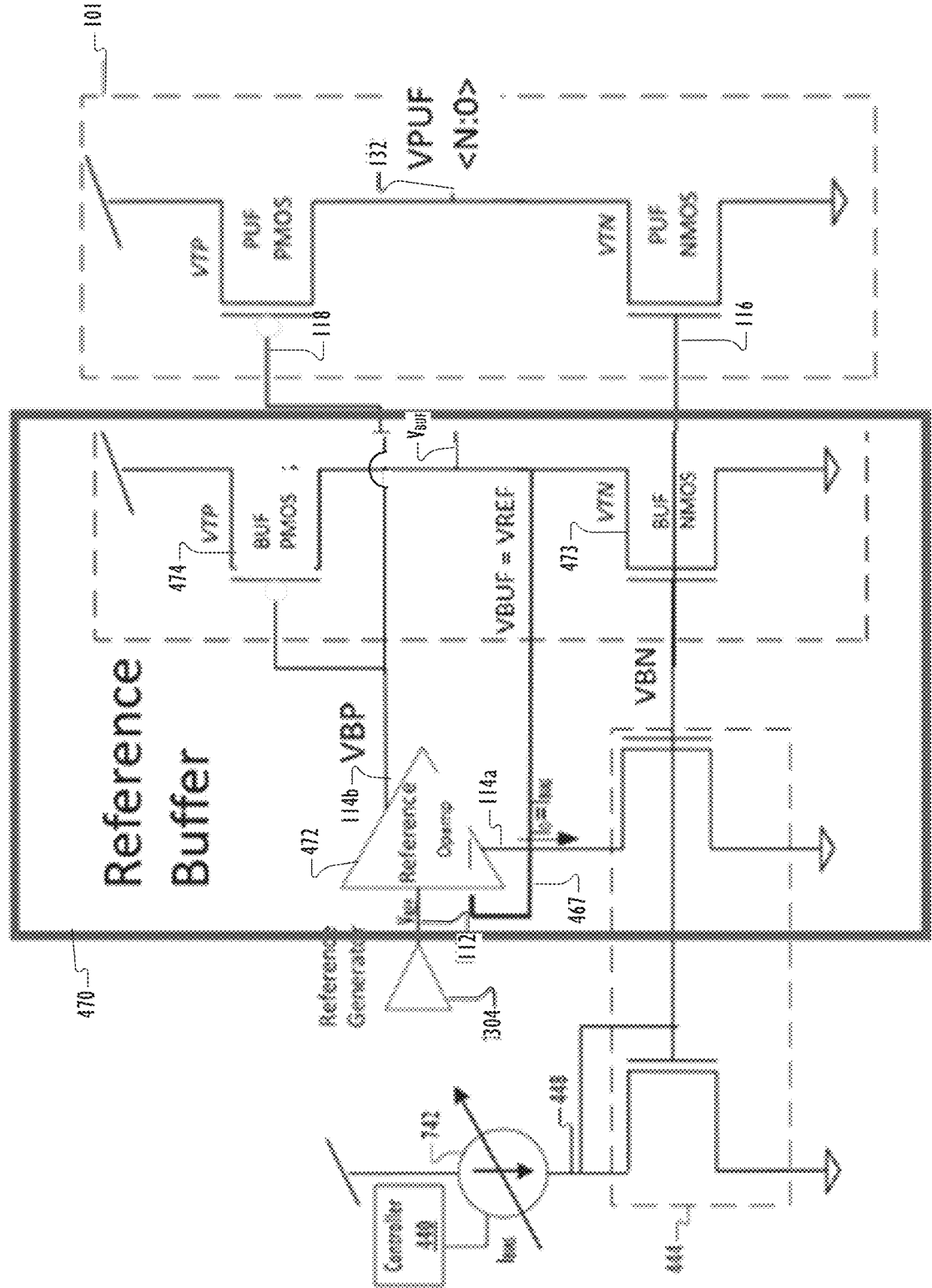
FIG. 4 illustrates an example unity-gain reference buffer of a current-based temperature compensation circuit for providing temperature stability to a CMOS PUF cell according to this disclosure.

The portion 102a of the compensation circuit 102 includes a reference voltage generator 104 and a reference buffer 106. The portion 102b of the compensation circuit 102 includes a threshold generator 108 and a comparator 110. The reference voltage generator 104 generates and outputs a biasing reference voltage $V_{Ref}$, which is used to bias the CMOS PUF cell 101. The reference buffer 106 receives the biasing reference voltage $V_{Ref}$ at a voltage input terminal 112 and replicates the biasing reference voltage $V_{Ref}$ to first and second buffer terminals 114a-114b. At least one of the first and second buffer terminals 114a-114b is electrically connected to at least one gate terminal 116, 118 of the CMOS PUF cell 101. In some embodiments, the reference buffer 106 is implemented using a unity-gain reference buffer, an example of which is shown in FIG. 4 and described below. In particular embodiments, the reference buffer 106 outputs the biasing reference voltage $V_{Ref}$ to both the first and second buffer terminals 114a-114b, thereby providing the biasing reference voltage $V_{Ref}$ as inputs to the CMOS PUF cell 101.

In this example, the CMOS PUF cell 101 includes an N-channel metal oxide semiconductor field-effect transistor (MOSFET) (NMOS) 120 and a P-channel MOSFET (PMOS) 122. The NMOS 120 includes the gate terminal 116, a source terminal 124, and a drain terminal 126, and the PMOS 122 includes the gate terminal 118, a source terminal 128, and a drain terminal 130. The drain terminals 126, 130 of the NMOS 120 and the PMOS 122 are connected to each other and thereby form a common node, and a PUF analog output signal 132 is generated at the common node during operation of the CMOS PUF cell 101.

The threshold generator 108 generates and outputs a threshold voltage ($V_{th}$) 134 to the comparator 110. The comparator 110 generates and outputs a digital output signal 136 based on a comparison of the PUF analog output signal 132 and the threshold voltage 134. For example, the comparator 110 may generate a high digital output when the PUF analog output signal 132 exceeds the threshold voltage 134 and a low digital output when the PUF analog output signal 132 does not exceed the threshold voltage 134. In some embodiments, the comparator 110 represents a single-bit comparator, which allows the comparator 110 to generate a digitized binary version of the analog output signal 132 from the CMOS PUF cell 101.

Although FIG. 1 illustrates one example of a system 100 for providing temperature stability to a CMOS PUF cell 101, various changes may be made to FIG. 1. For example, various components in FIG. 1 may be combined, further subdivided, replicated, omitted, or rearranged and additional components may be added according to particular needs. Also, FIG. 1 illustrates one example type of current-based temperature compensation circuit 102 used with one example type of CMOS PUF cell 101. However, the functionality of the current-based temperature compensation circuit 102 may be used in any other suitable device or system and may be implemented using any other suitable circuit components.

Figure 2:
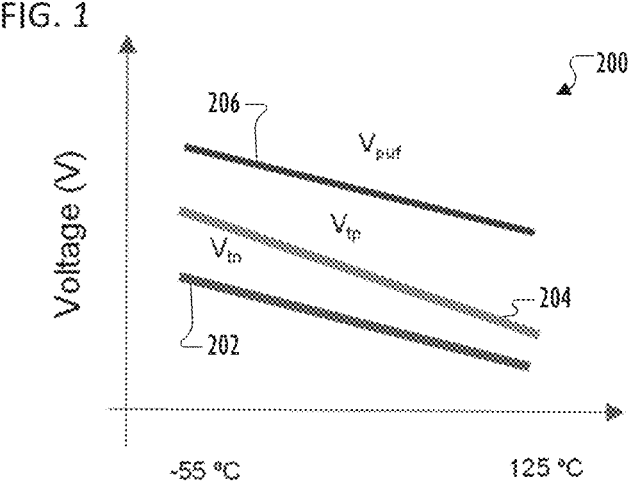
FIG. 2 illustrates an example graph showing operation of a CMOS PUF cell with respect to temperature according to this disclosure.

FIG. 2 illustrates an example graph 200 showing operation of a CMOS PUF cell with respect to temperature according to this disclosure. Here, a line 202 represents the threshold voltage ($V_{tn}$) of the NMOS 120 of the CMOS PUF cell 101, a line 204 represents the threshold voltage ($V_{tp}$) of the PMOS 122 of the CMOS PUF cell 101, and a line 206 represents the analog output signal ($V_{puf}$) 132 generated by the CMOS PUF cell 101. Here, the lines 202-206 are plotted over an extended temperature range, such as −55° C. to +125° C.

The graph 200 here shows that the NMOS 120 and the PMOS 122 have different temperature responses over the extended temperature range. In this example, the threshold voltage of the NMOS 120 has a generally linear relationship with respect to temperature and has a negative slope. The threshold voltage of the PMOS 122 also has a generally linear relationship with respect to temperature but has a more negative slope than the threshold voltage of the NMOS 120. The analog output signal 132 is based on a combination of the operations of the NMOS 120 and PMOS 122 with respect to temperature. More specifically, the temperature variation of the analog output signal 132 is due to the difference in the threshold voltages and mobilities of the NMOS 120 and PMOS 122 of the CMOS PUF cell 101, and one example of this is expressed in Equation (1). Note that, in some embodiments, the difference between the threshold voltages (lines 202 and 204) is such that the analog output signal 132 is constant. The variables of Equation (1) are described below in Table 1.

$$\frac{\Delta V_{OUT}}{\Delta T} = \left\{ a * \frac{\Delta V_{TN}}{\Delta T} - b * \frac{\Delta V_{TP}}{\Delta T} \right\} \quad (1)$$

TABLE 1

Variables of Equations 1-3

| Variable | Description |
| --- | --- |
| $\Delta V_{OUT}$ | Change in the analog output signal 132 of the CMOS PUF cell 101 |
| $\Delta T$ | Change of temperature of the CMOS PUF cell 101 |
| a | Function of $Vdsat_p$, $Vdsat_n$, $\lambda_p$, and $\lambda_n$ |
| b | Another function of $Vdsat_p$, $Vdsat_n$, $\lambda_p$, and $\lambda_n$ |
| $Vdsat_p$ | Drain saturation voltage of the PMOS 122 |
| $Vdsat_n$ | Drain saturation voltage of the NMOS 120 |
| $\lambda_p$ | Channel-length modulation of the PMOS 122 |
| $\lambda_n$ | Channel-length modulation of the NMOS 120 |
| Vdd | Direct current (DC) voltage provided to the PMOS 122 |
| $\Delta V_{TN}$ | Change of threshold voltage of the NMOS 120 |
| $\Delta V_{TP}$ | Change of threshold voltage of the PMOS 122 |

TABLE 1-continued

Variables of Equations 1-3

| Variable | Description |
| --- | --- |

In a particular non-limiting embodiment, the variable a of Equation (1) is expressed as in Equation (2), and the variable b is expressed as in Equation (3). The variables of Equation (2) and Equation (3) are described in Table 1.

$$a = [\{2Vdsat_p * Vdsat_n(\lambda_p + \lambda_n)\} * Vdsat_p] / \{\lambda_n Vdsat_n^2 + \lambda_p Vdsat_p^2\}^2 \quad (2)$$

$$b = [\{2Vdsat_p * Vdsat_n(\lambda_p + \lambda_n)\} * Vdsat_n] / \{\lambda_n Vdsat_n^2 + \lambda_p Vdsat_p^2\}^2 \quad (3)$$

Although FIG. 2 illustrates one example of a graph 200 showing operation of a CMOS PUF cell 101 with respect to temperature, various changes may be made to FIG. 2. For example, other CMOS PUF cells may have different responses to temperature variations.

Figure 3:
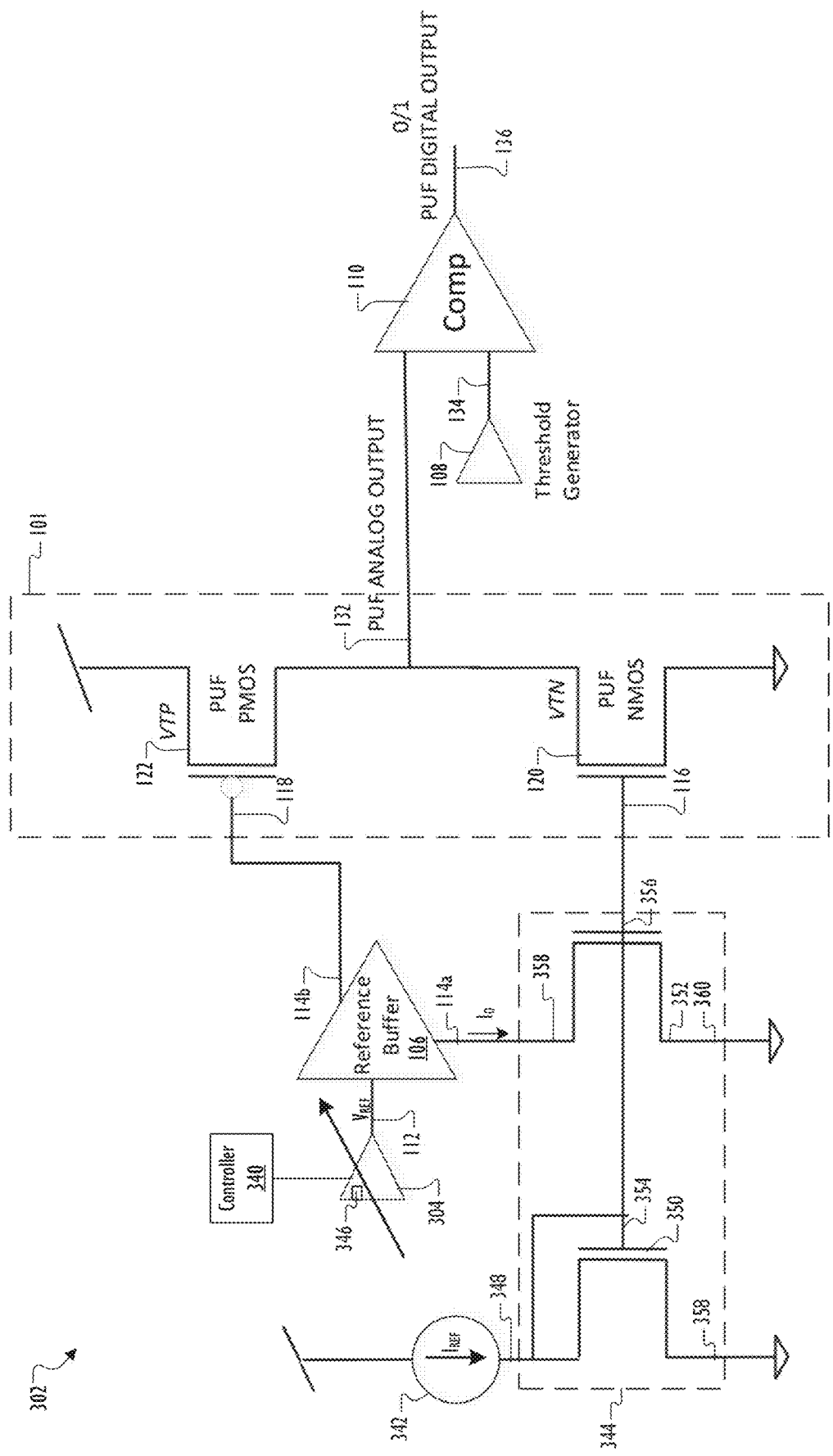
FIG. 3 illustrates a first example current-based temperature compensation circuit for providing temperature stability to a CMOS PUF cell according to this disclosure.

FIG. 3 illustrates a first example current-based temperature compensation circuit 302 for providing temperature stability to a CMOS PUF cell 101 according to this disclosure. As shown in FIG. 3, the current-based temperature compensation circuit 302 here operates by adjusting one or more inputs to the CMOS PUF cell 101. In this example, the current-based temperature compensation circuit 302 includes a reference generator 304, which may be the same as or similar to the reference voltage generator 104 described above. The current-based temperature compensation circuit 302 also includes the reference buffer 106, where the second buffer terminal 114b directly connects to the second gate terminal 118 of the CMOS PUF cell 101. The first buffer terminal 114a here connects to a biasing current mirror 344, which connects the first buffer terminal 114a to the first gate terminal 116 of the CMOS PUF cell 101. A current source 342 provides a reference current $I_{REF}$ to the biasing current mirror 344.

In the CMOS topology of the CMOS PUF cell 101, the analog output signal 132 depends on the supply voltage, input current, mismatch, reference voltage, comparator threshold voltage, and process variations. Thus, a controller 340 and the reference generator 304 cooperate to modify the reference voltage 112 with respect to temperature, which enables control of the inputs provided to the first and second gate terminals 116 and 118. This enables control of the output signal 132 or 136 to compensate for temperature drift and improve the yield. The controller 340 includes any suitable structure configured to provide temperature compensation, such as at least one microprocessor, microcontroller, digital signal processor (DSP), field programmable gate array (FPGA), application-specific integrated circuit (ASIC), or discrete circuit components.

In various embodiments, the controller 340 is configured to compensate for temperature variations of an output (such as in the signal 132 or 136) based on a weighted sum of a bandgap current ($I_{Bandgap}$), a current proportional to absolute temperature ($I_{PTAT}$), and a current complementary to absolute temperature ($I_{CTAT}$). In particular embodiments, the controller 340 controls the operations of the reference generator 304 using control signals that cause the reference generator 304 to generate the biasing reference voltage $V_{Ref}$ according to Equation (4). The variables of Equation (4) are described below in Table 2.

$$V_{Ref} = R * \{w * I_{Bandgap} + x * I_{PTAT} + z * I_{CTAT}\} \quad (4)$$

TABLE 2

Variables for controlling current-based
temperature compensation circuit

| Variable | Description |
| --- | --- |
| R | Constant resistance |
| w, x, and z | Weighting coefficients |
| $I_{Bandgap}$ | Bandgap current |
| $I_{PTAT}$ | Current proportional to absolute temperature |
| $I_{CTAT}$ | Current complementary to absolute temperature |

In this example, a bandgap reference circuit 346 generates the bandgap current $I_{Bandgap}$, the current proportional to absolute temperature $I_{PTAT}$, and the current complementary to absolute temperature $I_{CTAT}$. In some embodiments, the reference generator 304 includes the bandgap reference circuit 346, and the controller 340 is configured to obtain the weighting coefficients w, x, and z. In some cases, the weighting coefficients w, x, and z are programmable in the controller 340. The reference voltage generator 304 may normalize the temperature variation by using the weighted sum of these currents.

The biasing current mirror 344 receives the reference current $I_{REF}$ at a current input terminal 348 and replicates the reference current $I_{REF}$ at the first buffer terminal 114a. That is, the input current to the current mirror 344 is replicated as the output current $I_O$ of the current mirror 344, meaning $I_{REF}=I_O$. In this example, the current mirror 344 includes first and second NMOS 350 and 352. A drain of the first NMOS 350 is coupled to the current input terminal 348 of the current mirror 344, and a drain of the second NMOS 352 is coupled to the reference buffer 106. Respective gate terminals 354 and 356 of the NMOS 350 and NMOS 352 are coupled to each other (forming a common node) and to the gate terminal 116. Respective source terminals 358 and 360 of the NMOS 350 and NMOS 352 are coupled to ground.

Although FIG. 3 illustrates a first example of a current-based temperature compensation circuit 302 for providing temperature stability to a CMOS PUF cell 101, various changes may be made to FIG. 3. For example, various components in FIG. 3 may be combined, further subdivided, replicated, omitted, or rearranged and additional components may be added according to particular needs.

FIG. 4 illustrates an example unity-gain reference buffer 470 (UG buffer) of a current-based temperature compensation circuit for providing temperature stability to a CMOS PUF cell according to this disclosure. The UG buffer 470 may be the same as or similar to the reference buffer 106 described above. The UG buffer 470 here includes various components that may be the same as or similar to corresponding components used in the compensation circuit 302.

The UG buffer 470 includes a reference operational amplifier 472 (op-amp), a buffer NMOS 473, a buffer PMOS 474, and a feedback loop from an internal node $V_{BUF}$ to a feedback input terminal 476 of the op-amp 472. The buffer NMOS 473 and buffer PMOS 474 form an internal PUF that is a replica of the CMOS PUF cell 101. That is, the threshold voltages ($V_{tn}$ and $V_{tp}$) of the buffer NMOS 473 and buffer PMOS 474 can match the threshold voltages ($V_{tn}$ and $V_{tp}$) of the NMOS 120 and PMOS 122 of the CMOS PUF cell 101.

The first buffer terminal 114a connects to the biasing current mirror 344, which connects the first buffer terminal 114a to both the first gate terminal 116 of the CMOS PUF cell 101 and to the gate terminal of the buffer NMOS 473. That is, the first buffer terminal 114a provides the same n-type biasing voltage VBN to identical NMOS transistors (illustrated as "BUF NMOS" and "PUF NMOS"). The second buffer terminal 114b directly connects to the second gate terminal 118 of the CMOS PUF cell 101 and to the gate terminal of the buffer PMOS 474, thereby providing the same p-type biasing voltage VBP to identical PMOS transistors (illustrated as "BUF PMOS" and "PUF PMOS"). The drain terminals of the buffer NMOS 473 and the buffer PMOS 474 are connected to each other and thereby form a common node, namely the internal node $V_{BUF}$. During operation, the signal at the internal node $V_{BUF}$ is a replica of the PUF analog output signal 132.

The op-amp 472 receives the biasing reference voltage $V_{Ref}$ at a voltage input terminal 112 from the reference generator 304. Via the feedback loop and at the feedback input terminal 476, the op-amp 472 receives the signal from the internal node $V_{BUF}$ and uses the signal to replicate the biasing reference voltage $V_{Ref}$ to the first and second buffer terminals 114a-114b. As a result, the signal from the internal node $V_{BUF}$ becomes equal to the biasing reference voltage $V_{Ref}$ received at a voltage input terminal 112.

Although FIG. 4 illustrates one example of a unity-gain reference buffer 470 of a current-based temperature compensation circuit for providing temperature stability to a CMOS PUF cell, various changes may be made to FIG. 4. For example, various components in FIG. 4 may be combined, further subdivided, replicated, omitted, or rearranged and additional components may be added according to particular needs.

Figure 5:
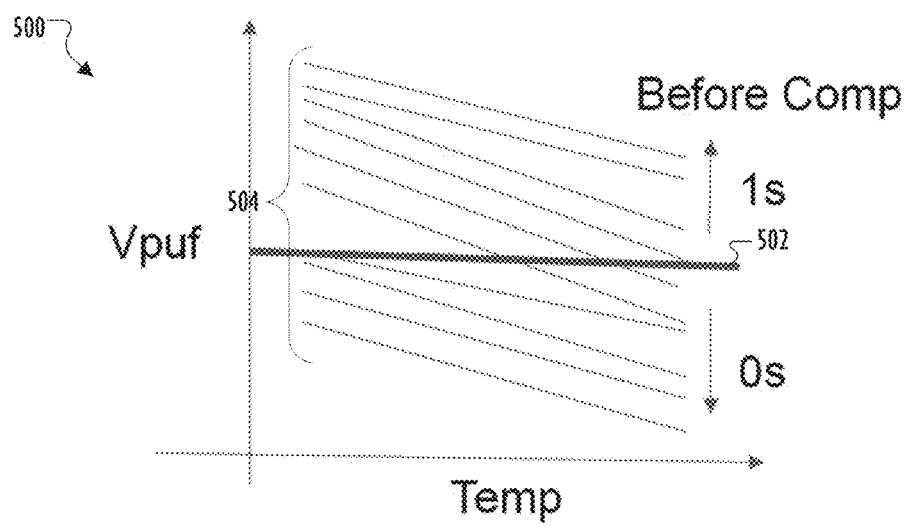
FIG. 5 illustrates an example graph showing uncompensated CMOS PUF measurements with respect to temperature according to this disclosure.

FIG. 5 illustrates an example graph 500 showing uncompensated CMOS PUF measurements with respect to temperature according to this disclosure. Here, uncompensated PUF measurements 504 vary with temperature over an extended temperature range. One characteristic of CMOS transistors is their intrinsic threshold voltages have a significant temperature coefficient, which is generally linear in nature. Single-ended PUF designs using CMOS transistors rely on a high gain configuration to achieve entropy in their analog output signals due to mismatches. Thus, when temperature variation is superimposed on mismatch variation, the result is a reduction of the yield of ones and zeros due to cross-over. The graph 500 shows a threshold voltage level 502, which is constant with respect to temperature. For example, the threshold voltage level 502 could represent the threshold voltage 134 of FIG. 1. In some embodiments, the value of the threshold voltage level 502 is 50% of $V_{DD}$ (a supply voltage). Measurements are taken at the output of the CMOS PUF cell 101 and are compared to the threshold voltage level 502. A high digital bit value (such as a logical "1") is determined for measurements greater than the threshold voltage level 502. A low digital bit value (such as a logical "0") is determined for measurements less than the threshold voltage level 502.

It is generally undesirable for the CMOS PUF cell 101 or other device to receive a constant input and generate different outputs depending on the temperature. An example of this is shown in FIG. 5, where uncompensated PUF measurements 504 are obtained from the CMOS PUF cell 101. For example, the uncompensated PUF measurements 504 could represent measurements obtained at the analog output signal 132 of FIG. 1. As can be seen here, the digital output value for the uncompensated PUF measurements 504 can either be high or low depending on the temperature. This type of issue may affect conventional CMOS PUF cells.

Figure 6:
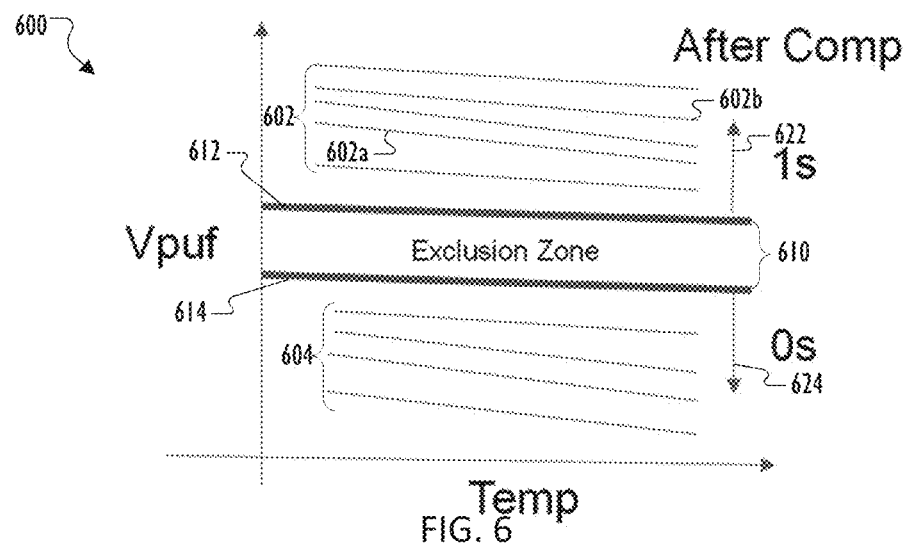
FIG. 6 illustrates an example graph showing compensated CMOS PUF measurements with respect to temperature according to this disclosure.

FIG. 6 illustrates an example graph 600 showing compensated CMOS PUF measurements with respect to temperature according to this disclosure. More specifically, FIG.

6 illustrates how the current-based temperature compensation circuit 302 may modify the outputs of the CMOS PUF cell 101 to avoid these types of problems. As shown in FIG. 6, the graph 600 shows that the current-based temperature compensation circuit 302 implements an exclusion zone 610 defined by an upper limit 612 and a lower limit 614 and a temperature range. The controller 340 sets the upper limit 612 and lower limit 614 of the exclusion zone. Without compensation, the comparator 110 may output a high digital value for voltages above the upper limit 612 and a low digital value for voltages below the lower limit 614. The digital bit value may be undeterminable when the analog output signal 132 has a voltage between the upper and lower limits 612, 614. When the controller 340 applies the exclusion zone 610, PUF outputs between the upper and lower limits 612, 614 are excluded from digitization. In other words, the exclusion zone 610 represents analog output voltages that are excluded from digitization, meaning the analog output signal 132 would need to have a value greater than or equal to the upper limit 612 or less than or equal to the lower limit 614. The exclusion zone 610 often represents a hysteresis that is employed to improve noise immunity.

In some embodiments, the exclusion zone 610 is a constant exclusion zone, where the upper and lower limits 612, 614 of the exclusion zone 610 are set at constant values. In some embodiments, the upper limit 612 is set at a constant value of 0.425V, and the lower limit 614 is set at a constant value of 0.3V. Of course, other exclusion zones 610 having different values for the upper and lower limits may be used.

In some embodiments, the exclusion zone 610 is a compensated exclusion zone, where the upper and lower limits 612, 614 are not constant but rather vary with respect to temperature. For example, each of the upper limit 612 and the lower limit 614 can be set to have a slope similar to PUF measurements 602, 604 (also referred to as non-volatile memory or "NVM" readings), thereby varying with respect to temperature similarly as the analog output signal 132. For example, if the inputs to the first and second gates 116 and 118 of the CMOS PUF 101 are uncompensated, the controller 340 and the threshold generator 908 (FIG. 9) cooperate to implement a temperature-dependent compensated exclusion zone. As another example, if the inputs to the first and second gates 116 and 118 of the CMOS PUF 101 are at least partially compensated by the reference generator 304 and/or current generator 742 to provide temperature stability, the controller 340 and the threshold generator 908 cooperate to implement the temperature-dependent compensated exclusion zone as additional temperature compensation.

Also, the controller 340 compensates the PUF measurements that are output from the CMOS PUF cell 101 at different temperatures within the extended temperature range such that the signal 132 or 136 corresponds to either a high digital bit value or a low digital bit value (but not both) over the extended temperature range. More specifically, there are no measurements here that can have one digital value at one temperature and a different digital value at another temperature. All measurements 602 above the upper limit 612 have a single digital value, and all measurements 604 below the upper limit 614 have a single digital value. More specifically, the PUF measurements 604 are controlled by a reference input (such as $V_{REF}$ or $I_{BIAS}$) to have a low bit value (such as a logical "0") with respect to temperature over an extended temperature range. An arrow 624 shows that the controller 340 can control the current generator 742 to generate the bias current $I_{BIAS}$ such that the voltage level of the analog output signal 132 corresponds to a low bit value by adjusting the lower limit 614. Similarly, the PUF measurements 602 are controlled by a reference input (such as $V_{REF}$ or $I_{BIAS}$) to have a high bit value (such as a logical "1") with respect to temperature over an extended temperature range. An arrow 622 shows that the controller 340 can control the current generator 742 to generate the bias current $I_{BIAS}$ such that the voltage level of the analog output signal 132 corresponds to a high bit value by adjusting the upper limit 612. This type of operation can be achieved by the controller 340 as described in more detail below.

Also, the controller 340 compensates the PUF measurements that are output from the CMOS PUF cell 101 at different temperatures within the extended temperature range such that the signal 132 or 136, over the extended temperature range, is more or less proportional, complementary, or spatially offset according to the value of the weighting coefficients, w, x, and z, respectively. When the controller 340 sets the temperature-dependent weighting coefficients to zero, {w, x, z}={0,0,0}, then the PUF analog output signal 132 ($V_{OUT}$) is uncompensated as shown in FIG. 5. The controller 340, by setting the proportional weighting coefficient x to a positive value or by increasing its value, compensates $V_{OUT}$ to have a more positive slope (versus temperature) compared to the slope of an uncompensated $V_{OUT}$. Analogously, the controller 340, by setting the complementary weighting coefficient y to a positive value or by increasing its value, compensates $V_{OUT}$ to have a more negative slope (versus temperature) compared to the slope of an uncompensated $V_{OUT}$. The controller 340, by setting the bandgap weighting coefficient w to a positive value or by increasing its value, compensates $V_{OUT}$ to shift to a higher voltage level by a constant amount across all temperatures within the extended temperature range. For example, a family of compensation PUF measurements 602 (FIG. 6) may shift spatially upward such that the position of graph 602a relocates up to the position of graph 602b, and the remainder of the PUF measurements 602 shift up by the same amount as between the graphs 602a and 602b. It is understood that the controller 340 can compensate $V_{OUT}$ to shift downward, to have a less positive slope, or to have a less negative slope by reducing the values of the weighting coefficients, w, x, and z respectively.

Although FIG. 5 illustrates one example of a graph 500 showing uncompensated CMOS PUF measurements with respect to temperature and FIG. 6 illustrates one example of a graph 600 showing compensated CMOS PUF measurements with respect to temperature, various changes may be made to FIGS. 5 and 6. For example, any other uncompensated and compensated measurements may be obtained depending on the implementation. For example, other CMOS PUF cells may have different exclusion zones or other operating characteristics.

FIG. 7 illustrates a second example current-based temperature compensation circuit 702 for providing temperature stability to a CMOS PUF cell 101 according to this disclosure. The compensation circuit 702 here includes various components that may be the same as or similar to corresponding components used in the compensation circuit 302. For example, the compensation circuit 702 includes a reference voltage generator 704, which may be the same as or similar to the reference voltage generator 104 described above. The compensation circuit 702 also includes a biasing current generator 742, which may be the same as or similar to the current source 342 described above. In this example, however, the controller 340 and the current generator 742 cooperate to control the current provided to the current mirror 344 with respect to temperature, which allows for control of the output signal 132 or 136 to compensate for the temperature drift and improve the yield. In some embodiments, the controller 340 controls the operation of the current generator 742 to cause the current generator 742 to generate a bias current $I_{BIAS}$ according to Equation (5).

$$I_{BIAS}=w*I_{Bandgap}+x*I_{PTAT}+z*I_{CTAT} \quad (5)$$

In this example, the current generator 742 generates the bias current $I_{BIAS}$ that is proportional to a weighted sum of the bandgap current $I_{Bandgap}$, the current proportional to absolute temperature $I_{PTAT}$, and the current complementary to absolute temperature $I_{CTAT}$. For example, the current generator 742 can normalize the temperature variation by using the weighted sum of these currents. The current generator 742 inputs the bias current $I_{BIAS}$ to the current input terminal 348 of the current mirror 344 as the reference current $I_{REF}$. The current input to the current mirror 344 is replicated as the output current $I_O$ of the current mirror 344. In some embodiments, the current generator 742 includes the bandgap reference circuit 346.

Although FIG. 7 illustrates a second example of a current-based temperature compensation circuit 702 for providing temperature stability to a CMOS PUF cell 101, various changes may be made to FIG. 7. For example, various components in FIG. 7 may be combined, further subdivided, replicated, omitted, or rearranged and additional components may be added according to particular needs.

FIG. 8 illustrates an example graph 800 showing CMOS PUF-related electrical currents with respect to temperature according to this disclosure. As shown in FIG. 8, a line 802 represents a bandgap current $I_{Bandgap}$, a line 804 represents a current proportional to absolute temperature $I_{PTAT}$, and a line 806 represents a current complementary to absolute temperature $I_{CTAT}$ with respect to temperature over an extended temperature range. In some embodiments, the bandgap reference circuit 346 generates each of the three currents: the bandgap current $I_{Bandgap}$, the current proportional to absolute temperature $I_{PTAT}$, and the current complementary to absolute temperature $I_{CTAT}$. The bandgap current shows that the bandgap reference circuit 346 provides a constant voltage reference with respect to temperature.

Although FIG. 8 illustrates one example of a graph 800 showing CMOS PUF-related electrical currents with respect to temperature, various changes may be made to FIG. 8. For example, other implementations may involve the use of different currents in the current-based temperature compensation circuit 702.

Figure 9:
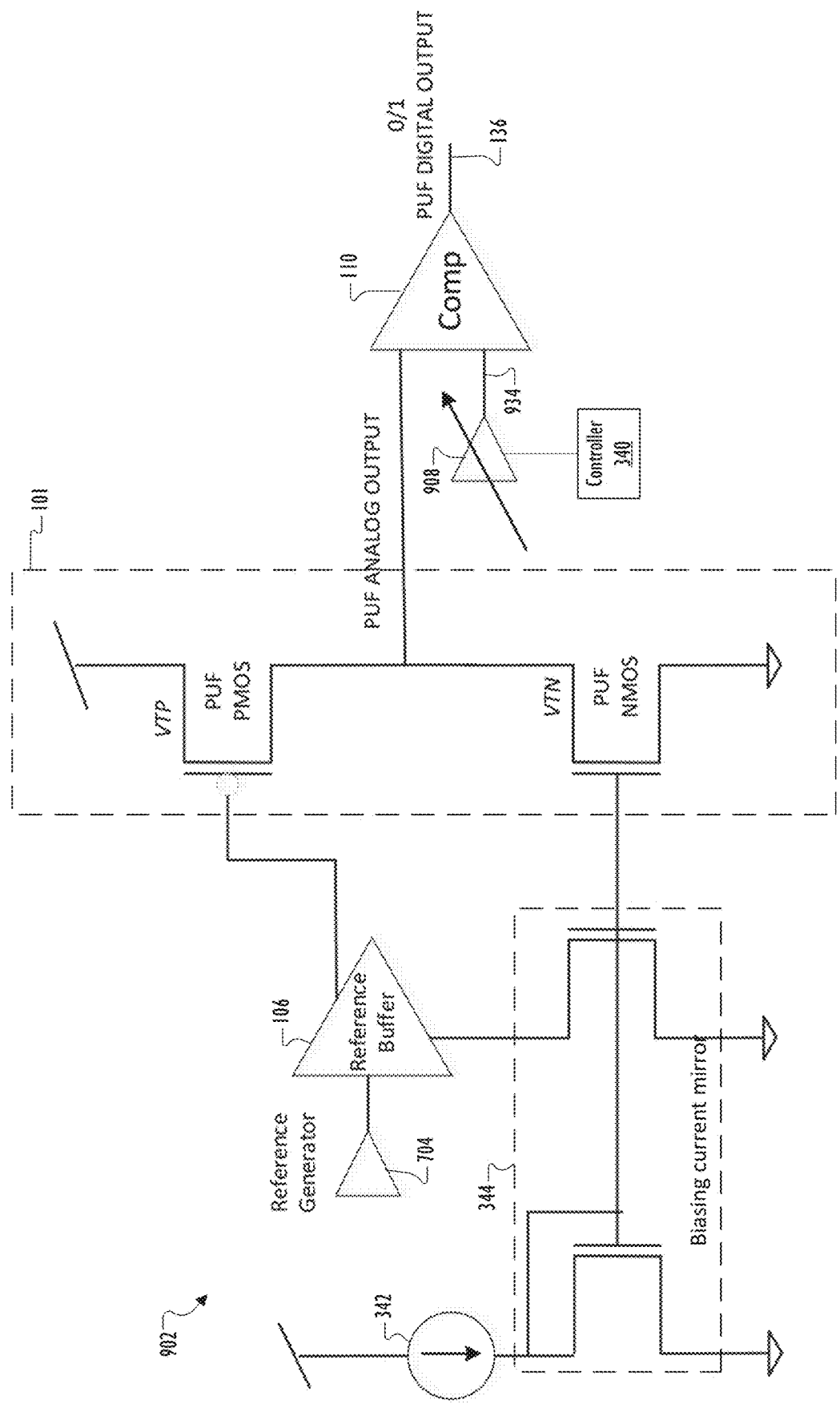
FIG. 9 illustrates a third example current-based temperature compensation circuit for providing temperature stability to a CMOS PUF cell according to this disclosure.

FIG. 9 illustrates a third example current-based temperature compensation circuit 902 for providing temperature stability to a CMOS PUF cell 101 according to this disclosure. In this example, the compensation circuit 902 includes various components from the compensation circuits 302 and 702 described above. Here, the compensation circuit 902 includes a threshold voltage generator 908, which may be the same as or similar to the threshold generator 108 described above. The controller 340 and the threshold voltage generator 908 cooperate to control a threshold voltage ($V_{th}$) 934 provided to the comparator 110, which allows for control of the output signal 136 to compensate for the temperature drift and improve the yield. In some embodiments, the controller 340 controls the operation of the threshold voltage generator 908 to cause the threshold voltage generator 908 to generate a threshold voltage $V_{th}$ 934 according to Equation (6).

$$V_{TH}=R_{TH}*\{w*I_{Bandgap}+x*I_{PTAT}+z*I_{CTAT}\} \quad (6)$$

The threshold voltage generator 908 generates a threshold voltage $V_{th}$ that is proportional to a weighted sum of the bandgap current $I_{Bandgap}$, the current proportional to absolute temperature $I_{PTAT}$, and the current complementary to absolute temperature $I_{CTAT}$. For example, the threshold voltage generator 908 can normalize the temperature variation by using the weighted sum of these currents. In some embodiments, the threshold voltage generator 908 includes the bandgap reference circuit 346. Also, in some embodiments, the controller 340 controls the threshold voltage generator 908 to generate the threshold voltage 934 and create an exclusion zone as shown in FIG. 6. Note that the threshold voltage generator 908 can generate the threshold voltage 934 independent of the signals on the buffer terminals 114a-114b, so the resistance $R_{TH}$ may have a different value than R of Equation (4). Also, in other embodiments, the threshold voltage 934 can be dependent upon the reference voltage $V_{REF}$. In some cases, the voltages $V_{TH}$ and $V_{REF}$ are not temperature-dependent and do not vary with respect to temperature. In other cases, the voltages $V_{TH}$ and $V_{REF}$ vary with respect to temperature. In still other cases, one but not both voltages $V_{TH}$ and $V_{REF}$ varies with respect to temperature.

Although FIG. 9 illustrates a third example of a current-based temperature compensation circuit for providing temperature stability to a CMOS PUF cell 101, various changes may be made to FIG. 9. For example, various components in FIG. 9 may be combined, further subdivided, replicated, omitted, or rearranged and additional components may be added according to particular needs.

Note that while FIGS. 3, 7, and 9 have illustrated different approaches in which current-based temperature compensation circuits can make adjustments to a CMOS PUF cell 101, different combinations of these approaches may be used. For example, the controller 340 described above has multiple degrees of freedom to perform temperature compensation, namely (i) controlling generation of the reference voltage $V_{REF}$ (FIG. 3); (ii) controlling generation of the bias current $I_{BIAS}$ (FIG. 7); and (iii) controlling generation of the threshold voltage $V_{TH}$ (FIG. 9). Depending on the implementation, the controller 340 may make adjustments to one, two, or three of these values to compensate for temperature variations, and the specific value or values that are adjusted may vary over time. Also note that while a single controller 340 is described above as being used to adjust all of these values, separate controllers may also be used.

Figure 10A:
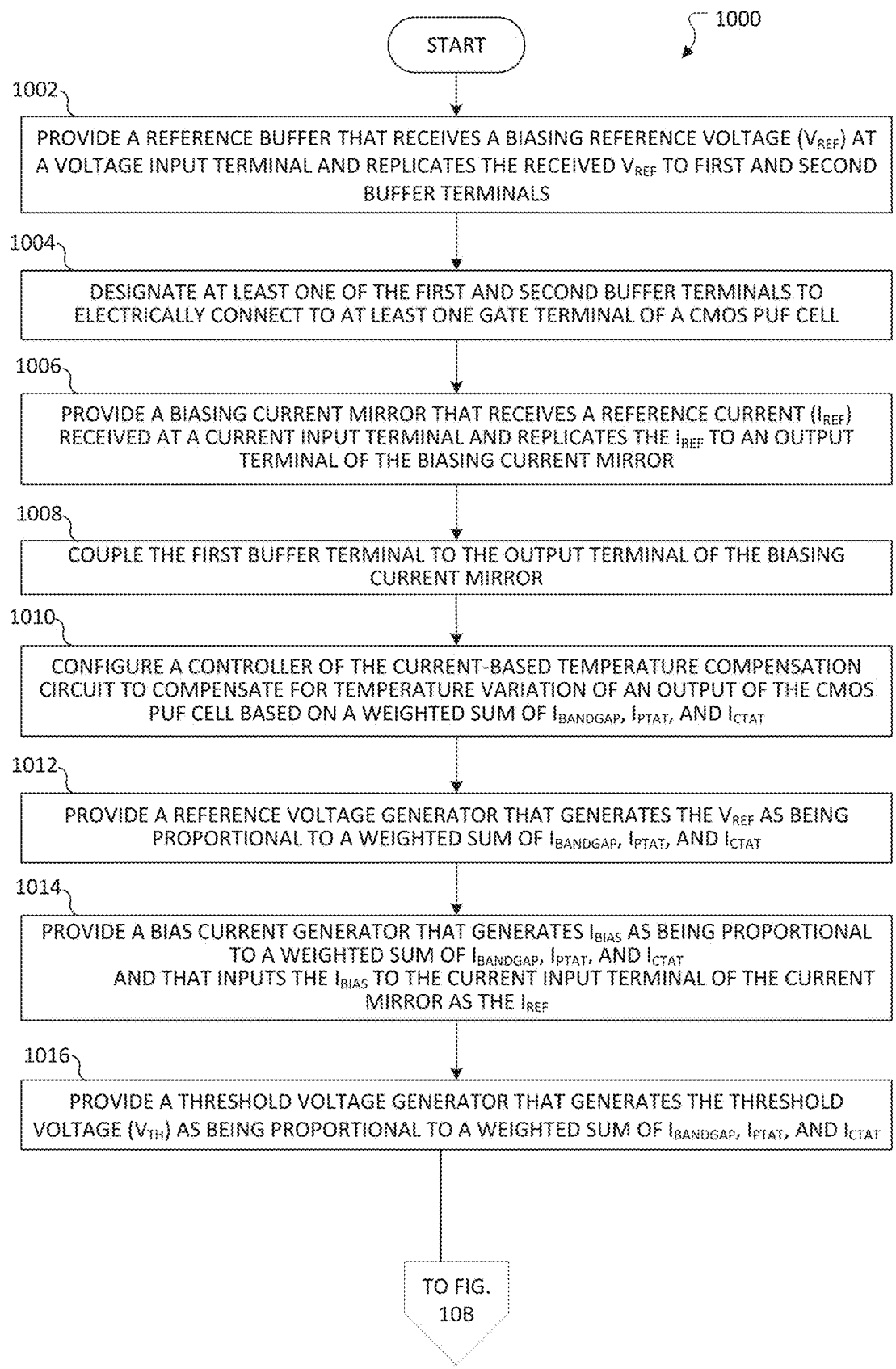
FIGS. 10A and 10B illustrates an example method for providing temperature compensation of a CMOS PUF cell according to this disclosure.
Figure 10B:
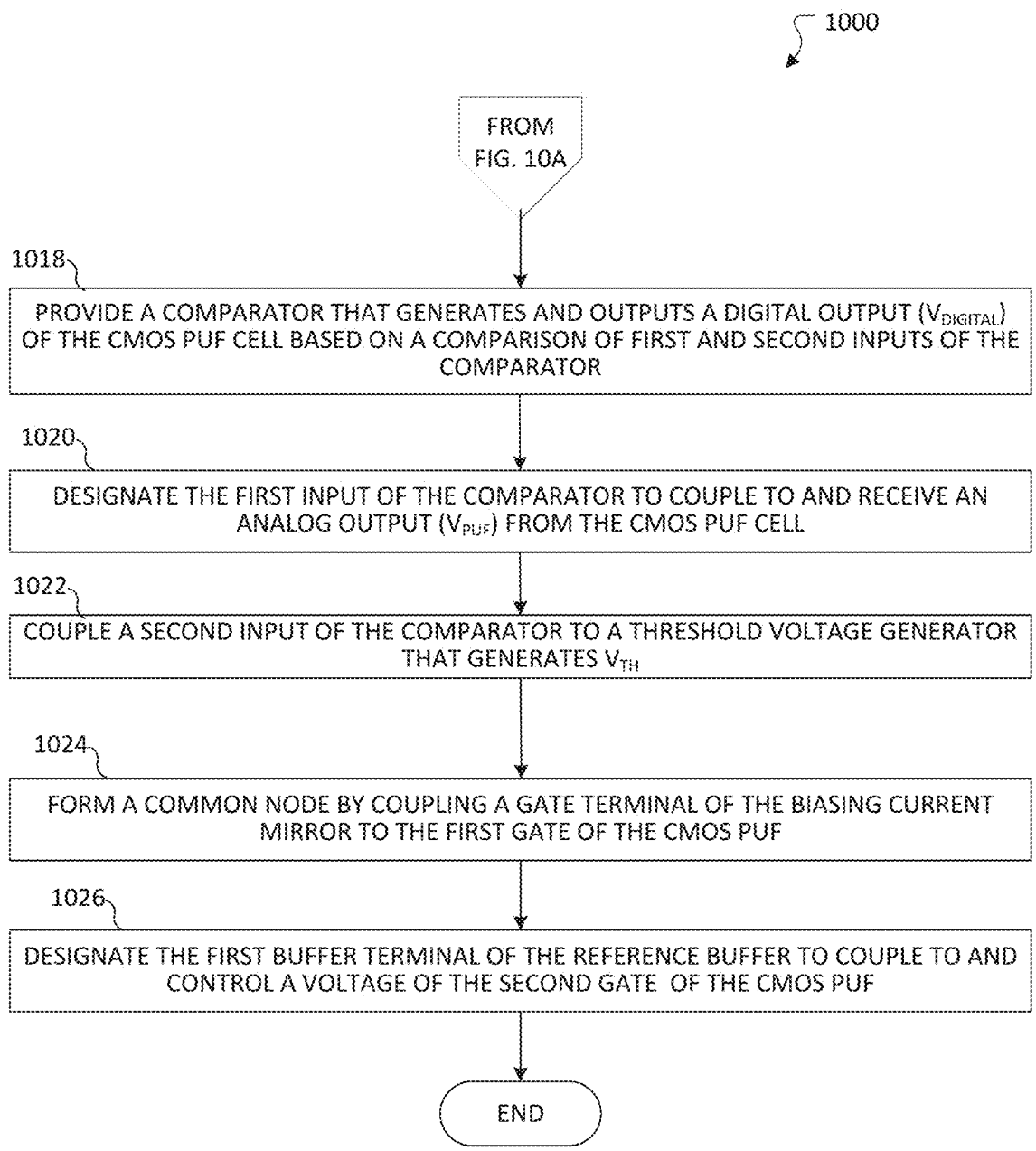

FIGS. 10A and 10B illustrate an example method 1000 for providing temperature compensation of a CMOS PUF cell according to this disclosure. For ease of explanation, the method 1000 is described as involving the manufacture of the current-based temperature compensation circuit(s) 302, 702, 902, which may be used within the system 100 of FIG. 1. However, the same or similar process may be used to form any other suitable compensation circuit.

As shown in FIG. 10A, at block 1002, a reference buffer 304 that is configured to receive a biasing reference voltage $V_{Ref}$ at a voltage input terminal 112 and replicate the received biasing reference voltage $V_{Ref}$ to first and second buffer terminals 114a-114b is provided. At block 1004, at least one of the first and second buffer terminals 114a-114b is designated to be electrically connected to at least one gate terminal of a CMOS PUF cell 101. At block 1006, a biasing current mirror 344 that is configured to receive a reference current $I_{REF}$ at a current input terminal and replicate the reference current $I_{REF}$ to an output terminal 358 of the biasing current mirror 344 is provided.

At block 1008, the first buffer terminal 116 is coupled to the output terminal 358 of the biasing current mirror 344. At block 1010, a controller 340 of the current-based temperature compensation circuit is configured to compensate for temperature variation of an output signal 132 or 136 of the CMOS PUF cell 101 based on a weighted sum of a bandgap current $I_{Bandgap}$, a current proportional to absolute temperature $I_{PTAT}$, and a current complementary to absolute temperature $I_{CTAT}$. At block 1012, a reference voltage generator that is configured to generate a reference voltage $V_{Ref}$ proportional to the weighted sum is provided. At block 1014, a bias current generator 742 that is configured to generate a bias current $I_{BIAS}$ proportional to the weighted sum is provided. The bias current generator 742 is configured to input the bias current $I_{BIAS}$ to the current input terminal 348 of the current mirror 344 as the reference current $I_{REF}$. At block 1016, a threshold voltage generator 908 that is configured to generate a threshold voltage $V_{th}$ proportional to the weighted sum is provided.

As shown in FIG. 10B, at block 1018, a comparator 110 that is configured to generate and output a digital output signal 136 based on a comparison of first and second inputs of the comparator is provided. At block 1020, the first input of the comparator 110 is designated to be coupled to and receive an analog output signal 132 from the CMOS PUF cell 101. At block 1022, a second input of the comparator 110 is coupled to a threshold voltage generator 908 that is configured to generate a threshold voltage 134. At block 1024, a common node is formed by coupling a gate terminal 354, 356 of the biasing current mirror 344 to the first gate 116 of the CMOS PUF 101. At block 1026, the first buffer terminal 114a of the reference buffer 106 is designed to be coupled to and control a voltage of the second gate 118 of the CMOS PUF 101.

Although FIGS. 10A and 10B illustrates one example of a method 1000 for providing temperature compensation of a CMOS PUF cell 101, various changes may be made to FIGS. 10A and 10B. For example, while shown as a series of steps, various steps in FIGS. 10A and 10B may overlap, occur in parallel, occur in a different order, or occur any number of times.

Figure 11:
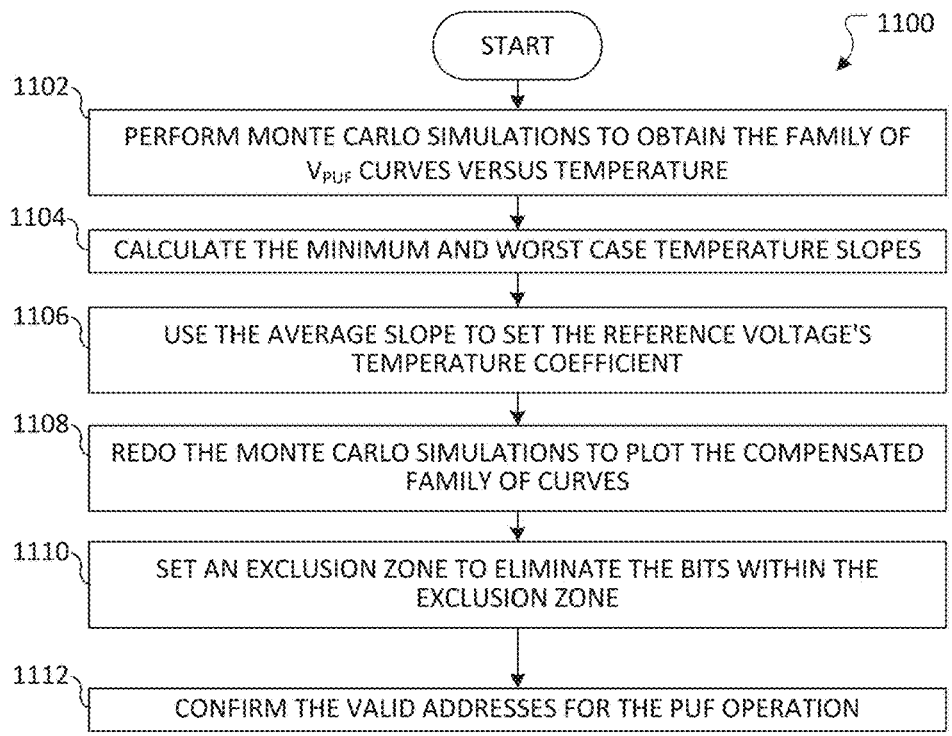
FIG. 11 illustrates an example method for designing a compensation procedure used by a controller according to this disclosure.

FIG. 11 illustrates an example method 1100 for designing a compensation procedure used by a controller 340 according to this disclosure. For example, the method 1100 may be performed to identify the exclusion zone to be used by the controller 340 during operation. The method 1100 here may be performed by a computing device, such as a desktop computer, laptop computer, server computer, tablet computer, or other suitable device.

As shown in FIG. 11, at block 1102, Monte Carlo simulations are performed to obtain the family of $V_{PUF}$ curves versus temperature. At block 1104, minimum and worst-case temperature slopes are calculated from among the PUF measurements (such as uncompensated PUF measurements 504). At block 1106, the average slope is used to set the temperature coefficient of the reference voltage $V_{REF}$. At block 1108, the Monte Carlo simulations are repeated to plot the compensated family of curves. At block 1110, an exclusion zone is set to eliminate bits within the exclusion zone. At block 1110, valid addresses are confirmed for operation of the COMS PUF 101.

Although FIG. 11 illustrates one example of a method 1100 for designing a compensation procedure used by a controller 340, various changes may be made to FIG. 11. For example, while shown as a series of steps, various steps in FIG. 11 may overlap, occur in parallel, occur in a different order, or occur any number of times.

Figure 12:
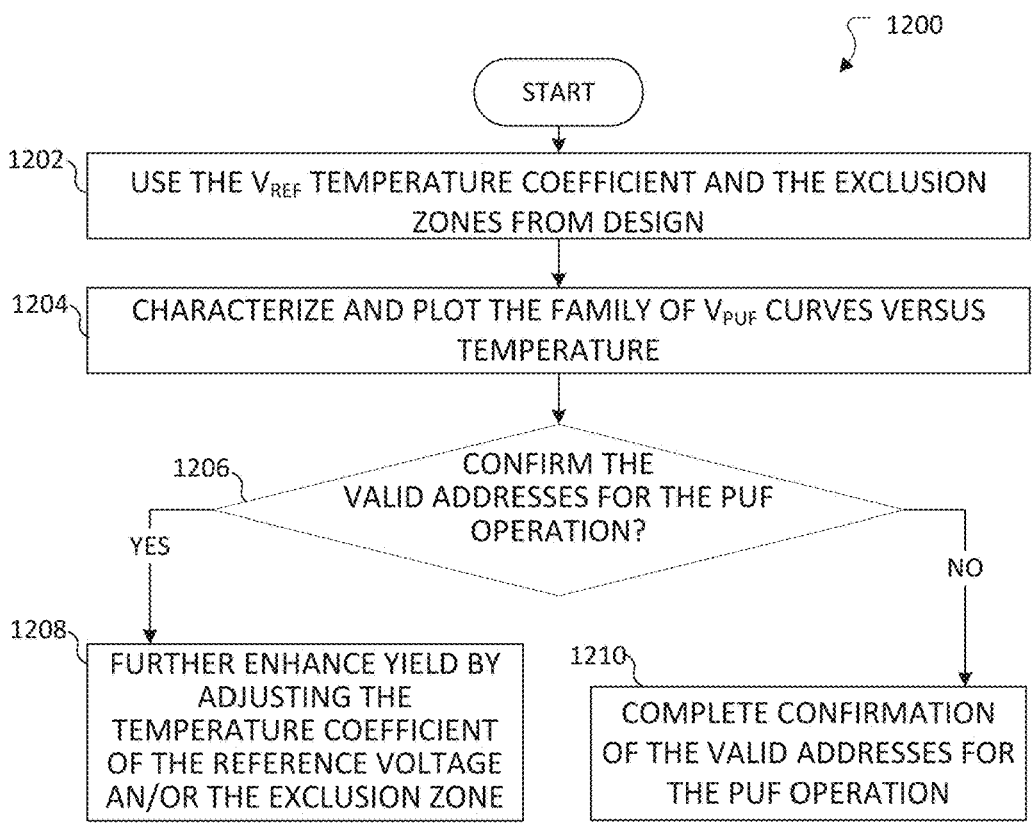
FIG. 12 illustrates an example method for testing the compensation procedure used by the controller according to this disclosure.

FIG. 12 illustrates an example method 1200 for testing the compensation procedure used by the controller according to this disclosure. For example, the method 1200 may be performed to test the exclusion zone to be used by the controller 340 during operation. The method 1200 here may be performed by a computing device, such as a desktop computer, laptop computer, server computer, tablet computer, or other suitable device.

As shown in FIG. 12, at block 1302, the temperature coefficient of $V_{REF}$ and the exclusion zone generated from the method 1100 are obtained. At block 1304, the family of $V_{PUF}$ curves versus temperature for a CMOS PUF cell 101 are characterized and plotted. At block 1206, the valid addresses for the PUF operation are confirmed. In some embodiments, confirming the valid addresses for the PUF operation includes determining whether further yield enhancement is desired. If so, the method 1200 proceeds to block 1208. If not, the method proceeds to block 1210. At block 1208, the temperature coefficient of the reference voltage and/or the exclusion zone can be adjusted. At block 1210, confirmation of the valid addresses for the operation of the CMOS PUF 101 is completed.

Although FIG. 12 illustrates one example of a method 1200 for testing the compensation procedure used by the controller 340, various changes may be made to FIG. 12. For example, while shown as a series of steps, various steps in FIG. 12 may overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed.

For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a current-based temperature compensation circuit comprising:
a reference buffer configured to receive a biasing reference voltage at a voltage input terminal and replicate the biasing reference voltage to first and second buffer terminals, at least one of the first and second buffer terminals configured to be electrically connected to at least one gate terminal of an analog complementary metal oxide semiconductor (CMOS) physically unclonable function (PUF) cell;
a biasing current mirror configured to receive a reference current at a current input terminal and replicate the reference current to the first buffer terminal; and
a controller configured to compensate an output of the CMOS PUF cell for temperature variation based on a weighted sum of a bandgap current, a current proportional to absolute temperature, and a current complementary to absolute temperature.

2. The apparatus of claim 1, wherein the current-based temperature compensation circuit further comprises a reference voltage generator configured to generate the biasing reference voltage, the biasing reference voltage proportional to the weighted sum.

3. The apparatus of claim 1, wherein the current-based temperature compensation circuit further comprises a bias current generator configured to:
generate a bias current that is proportional to the weighted sum; and
input the bias current to the current input terminal of the current mirror as the reference current.

4. The apparatus of claim 1, wherein the current-based temperature compensation circuit further comprises a threshold voltage generator configured to generate a threshold voltage that is proportional to the weighted sum.

5. The apparatus of claim 4, wherein the current-based temperature compensation circuit further comprises a comparator configured to:
receive the output of the CMOS PUF cell;
compare the output to the threshold voltage; and
generate a digital output based on the comparison.

6. The apparatus of claim 1, wherein:
the CMOS PUF cell comprises an N-channel metal oxide semiconductor field-effect transistor (MOSFET) having a first gate; and
a gate terminal of the biasing current mirror forms a common node with the first gate.

7. The apparatus of claim 6, wherein:
the CMOS PUF cell further comprises a P-channel MOSFET having a second gate; and
the second buffer terminal of the reference buffer is configured to control a voltage of the second gate.

8. A system comprising:
an analog complementary metal oxide semiconductor (CMOS) physically unclonable function (PUF) cell having at least one gate terminal; and
a current-based temperature compensation circuit comprising:
a reference buffer configured to receive a biasing reference voltage at a voltage input terminal and replicate the biasing reference voltage to first and second buffer terminals, at least one of the first and second buffer terminals electrically connected to the at least one gate terminal of the CMOS PUF cell;
a biasing current mirror configured to receive a reference current at a current input terminal and replicate the reference current to the first buffer terminal; and
a controller configured to compensate an output of the CMOS PUF cell for temperature variation based on a weighted sum of a bandgap current, a current proportional to absolute temperature, and a current complementary to absolute temperature.

9. The system of claim 8, wherein the current-based temperature compensation circuit further comprises a reference voltage generator configured to generate the biasing reference voltage, the biasing reference voltage proportional to the weighted sum.

10. The system of claim 8, wherein the current-based temperature compensation circuit further comprises a bias current generator configured to:
generate a bias current that is proportional to the weighted sum; and
input the bias current to the current input terminal of the current mirror as the reference current.

11. The system of claim 8, wherein the current-based temperature compensation circuit further comprises a threshold voltage generator configured to generate a threshold voltage that is proportional to the weighted sum.

12. The system of claim 11, wherein the current-based temperature compensation circuit further comprises a comparator configured to:
receive the output of the CMOS PUF cell;
compare the output to the threshold voltage; and
generate a digital output based on the comparison.

13. The system of claim 8, wherein:
the CMOS PUF cell comprises of an N-channel metal oxide semiconductor field-effect transistor (MOSFET) having a first gate; and
a gate terminal of the biasing current mirror forms a common node with the first gate.

14. The system of claim 13, wherein:
the CMOS PUF cell further comprises a P-channel MOSFET having a second gate; and
the second buffer terminal of the reference buffer is configured to control a voltage of the second gate.

15. The system of claim 8, wherein the CMOS PUF cell comprises a non-volatile memory cell.

16. A method comprising:
receiving a biasing reference voltage at a voltage input terminal of a reference buffer in a current-based temperature compensation circuit;
replicating the biasing reference voltage to first and second buffer terminals, at least one of the first and second buffer terminals electrically connected to at least one gate terminal of an analog complementary metal oxide semiconductor (CMOS) physically unclonable function (PUF) cell;
receiving a reference current at a current input terminal of a biasing current mirror in the current-based temperature compensation circuit;
replicating the reference current to the first buffer terminal; and
using a controller in the current-based temperature compensation circuit, compensating an output of the CMOS PUF cell for temperature variation based on a weighted sum of a bandgap current, a current proportional to absolute temperature, and a current complementary to absolute temperature.

17. The method of claim 16, further comprising:
generating a bias current that is proportional to the weighted sum; and
inputting the bias current to the current input terminal of the current mirror as the reference current.

18. The method of claim 16, further comprising:
generating a threshold voltage that is proportional to the weighted sum;
comparing the output of the CMOS PUF cell to the threshold voltage; and
generating a digital output based on the comparison.

19. The method of claim 16, wherein:
the CMOS PUF cell comprises an N-channel metal oxide semiconductor field-effect transistor (MOSFET) having a first gate; and
a gate terminal of the biasing current mirror forms a common node with the first gate.

20. The method of claim 19, wherein:
the CMOS PUF cell further comprises a P-channel MOSFET having a second gate; and
the second buffer terminal of the reference buffer controls a voltage of the second gate.

\* \* \* \* \*